United States Patent [19]
Yang

[11] Patent Number: 6,023,109
[45] Date of Patent: *Feb. 8, 2000

[54] MULTI-VOLTAGE CONTROL CIRCUIT OF BATTERY OR MULTIPLE INDEPENDENT DC POWER

[76] Inventor: Tai-Her Yang, 5-1 Taipin St., Si-Hu Town, Dzan-Hwa, Taiwan

[*] Notice: This patent is subject to a terminal disclaimer.

[21] Appl. No.: 08/486,723

[22] Filed: Jun. 7, 1995

Related U.S. Application Data

[63] Continuation of application No. 08/346,357, Nov. 29, 1994, Pat. No. 5,461,264, which is a continuation of application No. 07/963,449, Oct. 19, 1992, abandoned.

[51] Int. Cl.$^7$ ...................................................... H02J 1/00
[52] U.S. Cl. ................................... 307/81; 307/63; 307/77
[58] Field of Search ................................. 307/43, 54, 61, 307/63, 77, 80, 81, 85; 323/283; 363/65, 71

[56] References Cited

U.S. PATENT DOCUMENTS 5,461,264  10/1995  Yang ........................................... 307/81

*Primary Examiner*—Adolf Denake Berhane
*Attorney, Agent, or Firm*—Leonard Bloom

[57] ABSTRACT

Circuit of multi-voltage control circuit of battery of multiple independent DC power consists of a diode compound switch contact for resisting sparkle and segmented current when multi-voltage switches add the non-sparkle switch for series of solid switch member which forms linear voltage adjustment of basic grade and voltage of low loss, or chopped wave voltage adjustment of low pulse. The advantages of the present invention are that it loses less thermal, is highly efficient, and has low pulse. It can provide fine quality graded voltage and a voltage adjustment between further grades.

28 Claims, 16 Drawing Sheets

|     | SSS100 | SW500 | SW501 | SW502 | SW503 | SW504 | SW505 |
|-----|--------|-------|-------|-------|-------|-------|-------|
| H   |        | ON    | ON    | ON    | OFF   | OFF   | ON    |
| M↔H | ON     | ON    | ON    | ON    | OFF   | OFF   | OFF   |
| M   |        | ON    | OFF   | ON    | OFF   | OFF   | ON    |
| L↔M | ON     | ON    | OFF   | ON    | OFF   | OFF   | OFF   |
| L   |        | ON    | OFF   |       | ON    |       |       |
| 0↔L | ON     | OFF   | OFF   | OFF   | ON    | ON    |       |

MULTI-VOLTAGE CONTROL CIRCUIT OF BATTERY OR MULTIPLE INDEPENDENT DC POWER

This application is a continuation of application Ser. No. 08/346,357 filed Nov. 29, 1994, now U.S. Pat. No. 5,461,264 which is a continuation of application Ser. No. 07/963,449, filed Oct. 19, 1992, now abandoned.

BACKGROUND OF THE INVENTION

Because battery is portable and mobile, it is widely used for various kinds of appliances, such as electric vehicles, etc. But the kind of storage, or fuel, or thermal, or sun-power battery has physical basic voltage. Generally speaking, we shall choose its voltage and capacity by means of its multiple series and supply it in accordance with the need of load by means of graded voltage, or control it by serial linear members, or operate it by chopped wave switches. This is an efficient circuit design mainly to provide a multi-output graded multi-voltage, and further to connect with linear or chopped wave solid switch members so as to attain non-sparkle multi-voltage switching and graded voltage combining with linear voltage adjustment, or low ripple-wave PWM voltage output of graded voltage combining with chopped wave voltage adjustment. And "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or the slowly voltage-rising or slowly voltage-dropping output which forms between valley bottom voltage and peak and is controlled by adjustable linear, or PWM of it", and outputs the adjusting function by means of further feedback of limited current, or constant current and set voltage.

SUMMARY OF THE INVENTION

Circuit of Multi-voltage Control Circuit of Battery or Multiple Independent DC Power consists of a diode compound switch contact for resisting sparkle and segmented current when multi-voltage switches to add the non-sparkle switch for series of solid switch member which forms linear voltage adjustment of basic grade and voltage of low loss, or chopped wave voltage adjustment of low pulse. The advantages of the present invention are that it loses less thermal, is highly efficient, and has low pulse. It can provide fine quality graded voltage and a voltage adjustment between further grades.

BRIEF DESCRIPTION OF THE DRAWINGS

FIG. 29 is a chart showing the on/off condition of the respective switches SSS100 and SW500–SW505 (inclusive)

under various operating conditions of the control circuits of the present invnetion.

DETAILED DESCRIPTION OF THE INVENTION

Figure 1:
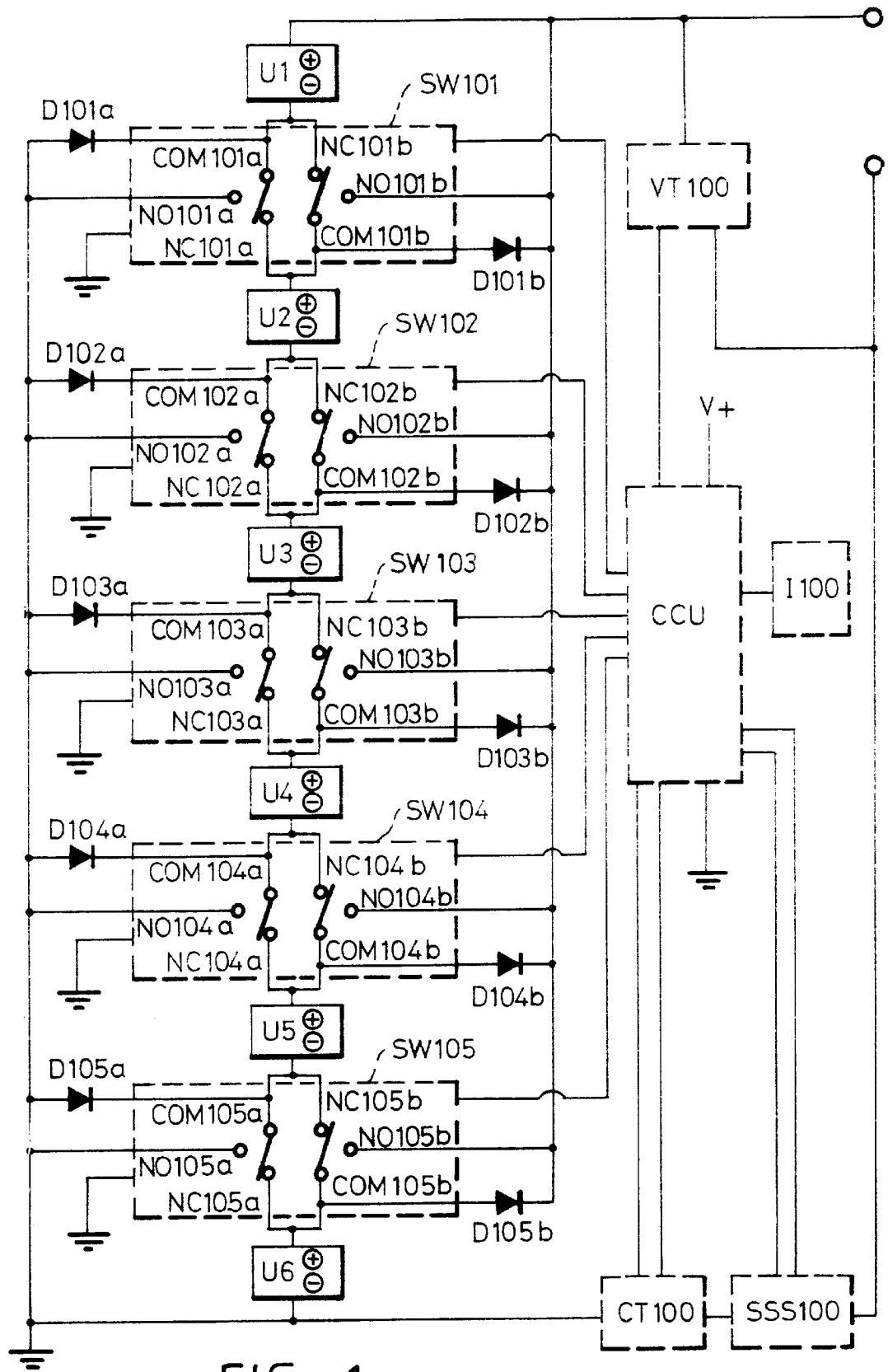
FIG. 1 is a view of two-knife and two-throw switch multiple series diode for multi-voltage switch according to an embodiment of the invention.

FIG. 1 illustrates one exemplary embodiment of the Circuit of Multi-voltage Driven Circuit of Battery or Multiple Independent DC Power. By means of batteries U1–U6 and serial two-throw contact switches SW101–SW105, it forms a multi-voltage output. The switches SW101–SW105 when outputting will make switch contact to form a multiple series battery connection. This connection is directly through the switch contacts and eliminates a diode's direct voltage reducing and thermal loss. The circuit can further combine with current inspection device CT100 and linear or switch-mode solid switch member SSS100, and combine with a central processing unit (CCU) to accept operation order of input device instruction so as to control electric-mechanical switches SW101–SW105 and solid switch member SSS100 for adjusting output current flow or adjusting the output constant voltage, or to set the limits of output current value, or constant current. By means of linear adjustment, or by PWM control, which is in series with battery and diode and between their on-off switches, the low pressure voltage becomes a valley and high pressure voltage of the second section becomes a peak. The result is a low ripple-wave voltage output which forms between valley bottom voltage and peak. The output mat be relatively precisely controlled by adjustable linear or PWM control.

To prevent sparkling when an electric-mechanical switch SW101–SW105 is turned on, the time of operation of solid switch SSS100 (on) is suspended at the on position. When an electric-mechanical switch SW101–SW105 is turned off, the time of operation of solid switch SSS100 turning off precedes turning off the electric-mechanical switch, to cut off power and thereby achieve non-sparkle on-off electric-mechanical switches. This function further comprises the non-sparkle turning on/off of positive/negative polar on/off switch of output side, such as illustrated hereinbelow as SWF and SWR of FIGS. 24 & 25.

The structure and operation of this embodiment are disclosed as follows.

Two sets or more than two sets of battery units of same voltage, same capacity, or at least of same voltage, including linear or quadratic storage battery, sun-power battery, fuel battery, or thermal battery are provided. A more than two-knife manual two-throw switch, drum switch, or electric-mechanical switch member, such as magnetic or mechanical operated relay, etc., is disposed between battery units and tends to be in direct-polar series with batteries. The batteries may be arranged as a single battery or multiple series, or multipled in parallel, or multipled in parallel and further in series with other multiples to be a battery unit. As illustrated in FIG. 1, common contacts of two sets of different knives (A and B) of a two-knife switch are in replacement series with the open contact; that is, the common contact of knife A (such as COM 101*a* of FIG. 1, SW101) is connected to normally closed contact of knife B (NC101*b* of SW101), and the common contact of knife B (COM 101*b* of SW101) is connected to the normally closed contact of knife A (NC101*a* of SW101). Each pair of connected contact is respectively connected to either a positive or negative pole of a battery unit. Each common contact of a switch that is connected to the positive battery pole(COM101*b* of SW101) has its common contact in direct multipled series with diode (D101*b* of SW101) and through the diode connects to its open contact (NC101*b* of SW101) and further to the first battery unity (U1 positive terminal)and output positive end; each common contact of a switch that is connected to the negative battery pole has its common contact (COM101*a* of FIG. 1) and open contact (NC101*a* of FIG. 1) in direct series through diode (D101*a* of FIG. 1), and through the diode is connected from open contact (NC101*a* of FIG. 1) to the negative pole of the last battery (U6) and output negative end. The electric-mechanical switch member can be a manually actuated switch, or megnetically actuated, or be actuated by other mechanism.

Said systematic operation has the following function and advantages:

1. According to the common divisor symmetric to on/off switch, added to wholly open or wholly close contacts, it can provide multiple choice for multi-voltage output.
2. When output, all multiple contacts of diode are tended to close so that they can eliminate direct pressure drop and thermal loss of diode.
3. When turned on/off, diode provides linear graded voltage for lessening switch voltage, and used as transient current path to prolong the life of switch contact.
4. Power unit on-off switch or solid switch member can be further selected to be two-phase conductive member or inverse-phase device so as to provide for control over the input voltage and current, or the serial and multiple situation of on-off power unit when it is inversely input from the output end, and for control over solid switch member (if there is one) so as to fit the situation of external input power.

Figure 2:
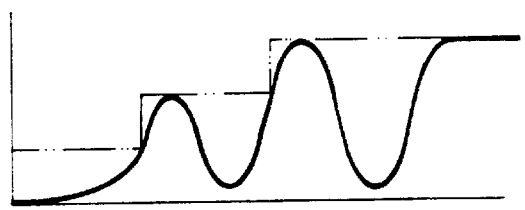
FIG. 2 is a view of linear adjustment voltage wave of multi-voltage.
Figure 3:
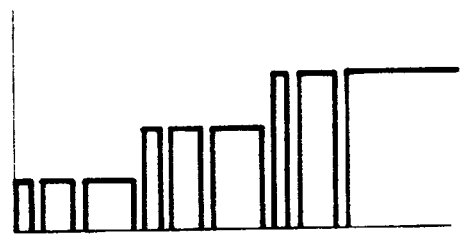
FIG. 3 is a view of chopped wave adjustment voltage wave of multi-voltage.

Take the embodiment in FIG. 1 for example, composed of switch SW101–SW105 between six sets of battery units U1–U6, each switch has diode D101*a*–105*a* according to said principle, its input end multiples to pass negative output end; D101*b*–105*b* output end multiples to pass positive output end; when common contact and close contact of operating switch SW101–105 are tended to close, all battery units are multipled and in series with output voltage which is 6× EB; that is, every three sets of battery units tend to be serialized and then multipled; when SW102 and SW104 are controlled to be common contact and be converted to connect with open contact, output voltage will be 2× EB; that is, every two battery units are serialized and then multipled; when switch SW101–SW105 are controlled to be common contact and be converted to connect with open contact, output voltage will be EB; that is, battery unit U1–U6 are multipled. If we use 24 sets of voltage to construct for battery units, we get multi-voltage grades of 1× EB, 2× EB, 3× EB, 4× EB, 6× EB, 8× EB, 12× EB, 24× EB; If we use 36 sets of voltage unit, we get 1× EB, 2× EB, 3× EB, 4× EB, 6× EB, 9× EB, 12× EB, 18× EB, 36× EB, all the graded multi-voltage output is formed by battery unit multiple value according to the common divisor of battery units, others are analog of this example and need not to be mentioned here. Said switch unit can be manual, or be controlled by a central processing unit (CCU) and input unit I100 so as to control said switch unit to turn multi-voltage on/off; or to further serialize linear or switch open solid switch member SSS 100 at the output terminal so as to adjust and control the electric-mechanical switch operation situation and solid switch work situation which is relative to input value, the situations are as follows:

directly by means of linear solid switch member, trim the output of graded voltage or by means of controlling electric-mechanical switch, make the output higher than the needed output value, and then use the central processing unit (CCU) to control the driven current of linear solid switch member so as to get the adjustment of linear output voltage; referring to FIG. 2, if we want to trim the adjustment of a large voltage larger than a unit of battery units voltage potential grade, we can do it by means of electric-mechanical switch unit and its thermal loss will be lessened;

directly by means of switch solid switch member, trim the output of graded voltage or by means of controlling electric-mechanical switch, make the output higher than the needed output value, and then use the central processing unit (CCU) to control the driven pulse range of switched solid switch member so as to get the adjustment of average output voltage; referring to FIG. 3, if we want to trim the adjustment of a large voltage larger than a unit of battery units voltage potential grade, we can do it by means of electric-mechanical switch unit, because it has graded basic voltage, ripple-wave value is lower than that of wave-loaded adjustment of the whole voltage directly.

We can further serialize an inspection device CT100 to the output circuit so as to inspect its output current value feeding back to central processing unit (CCU), according to the input unit instruction or the preset value in CPU, and control mutually and relatively electric-mechanical switch and solid switch, and at the output terminal it multipled inspection device VT100 so as to inspect its output voltage value which feeds back to CCU, and in accordance with instructions of input unit, or with the mutual control of solid switch and electric-mechanical switch of preset value in CCU. Similar to the conventional steady voltage circuit, because this circuit has a standard potential, in addition to adjusting the voltage change caused by unsteady load, it can adjust loaded side voltage change caused by unsteady power voltage. For example, voltage drops in a battery because storage is reduced, or voltage is unsteady in a sun-power battery because sunlight amount is changed.

Besides, the most important thing is that by means of the following controlled order, we may achieve the following functions: when switching electric-mechanic switch, at the "on" position, solid switch (on) operation time suspends after the electric-mechanic switch, at the "off" position, solid switch (off) operation time precedes electric-mechanic switch to turn the power off so as to attain non-sparkle on/off electric-mechanic switch, this switch further includes non-sparkle switching of positive and negative polar on/off switch of output side.

Said set operation order includes mode of manual, electric magnetic, mechanic, and flow control, according to said switch operation order, it may be locked up or delayed by mechanic order, or order locked up or delayed by circuit.

Figure 4:
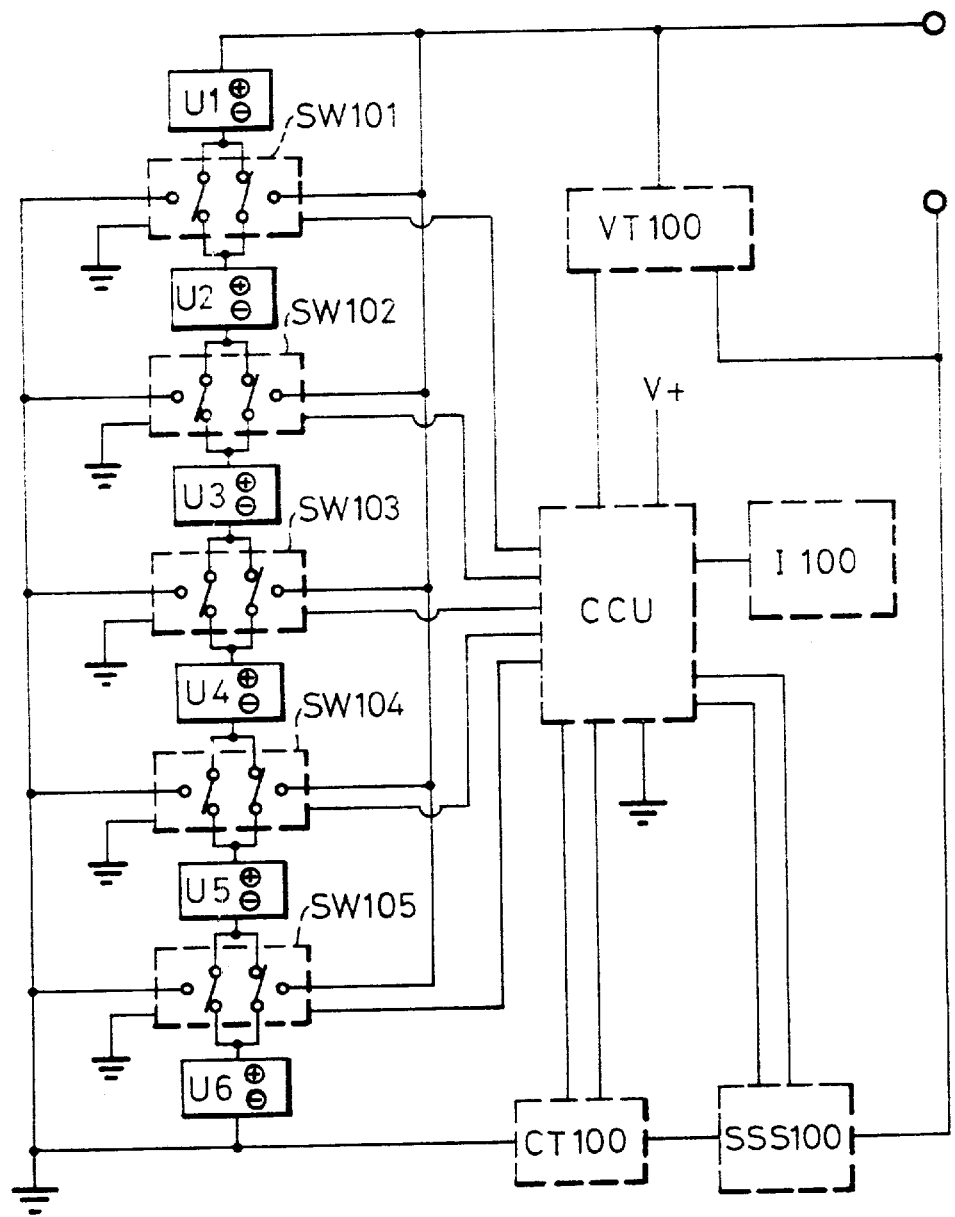
FIG. 4 is a view of multi-voltage switch circuit of two-knife and two-throw switch.

This kind of circuit, when put into practical uses, if power capacity is lower, diode can be omitted, too, and two-knife two and two-throw switch can directly turn on/off other function. The same as the embodiment in FIG. 1, when using, it can further connect to solid switch member and output voltage current inspection member and by means of input unit and central control unit CCU, it has various function. FIG. 4 is a view of multi-voltage switch circuit of two-knife and two-throw switch.

Figure 5:
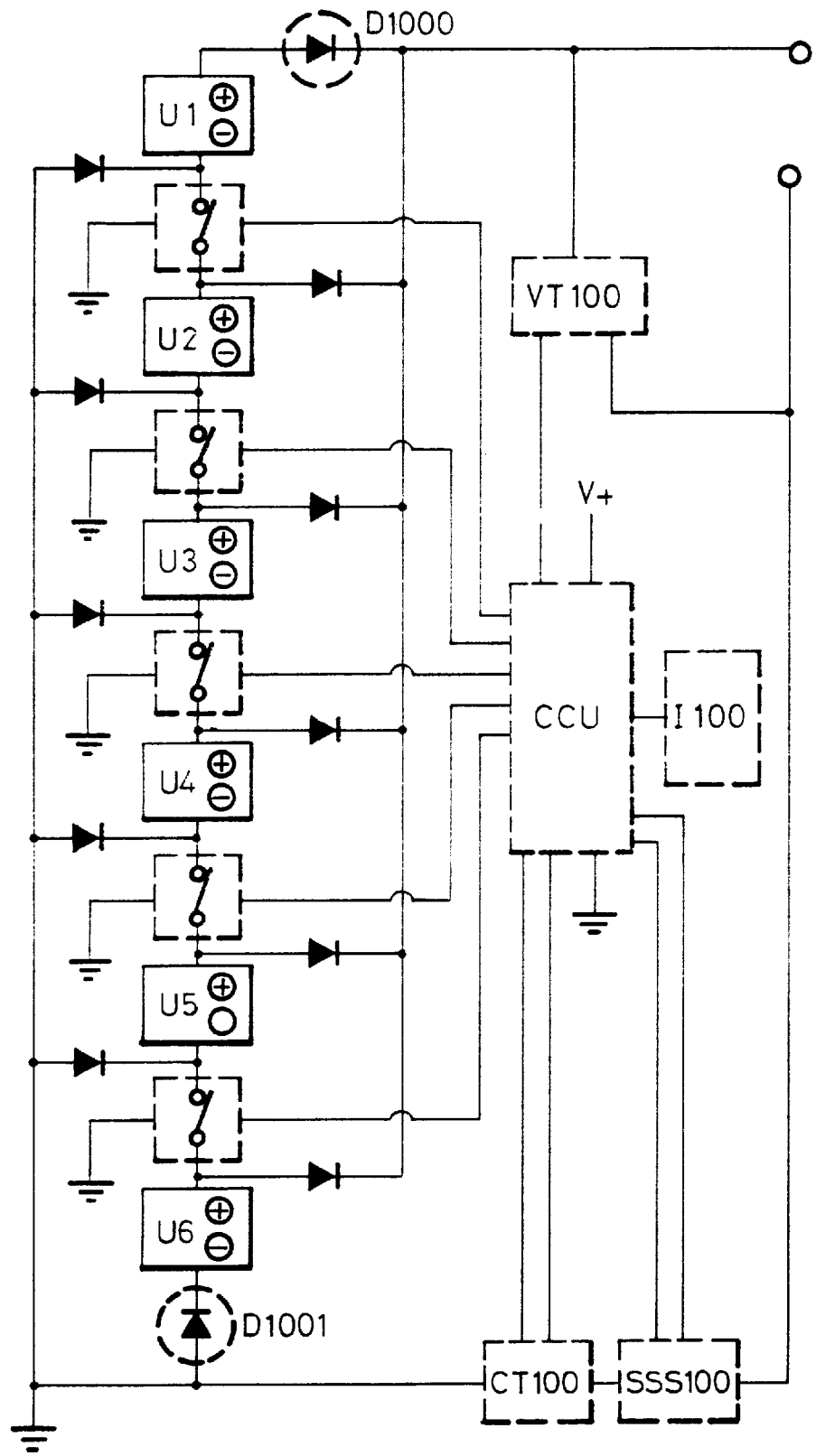
FIG. 5 is a view of multi-voltage switch circuit of single-knife switch.

If circuit efficiency is available and application is limited by space, we can connect single-knife single-throw switch to diode so as to produce on/off switching multi-voltage output function, in application we can further connect solid switch member and output voltage current inspection member and by means of input unit, CCU produces various same function. FIG. 5 is a view of multi-voltage switch circuit of single-knife switch. In FIG. 5, D1000 and D1001 are diodes for average pressure used to provide battery multipled for average voltage, can be disposed on it when needed.

Figure 6:
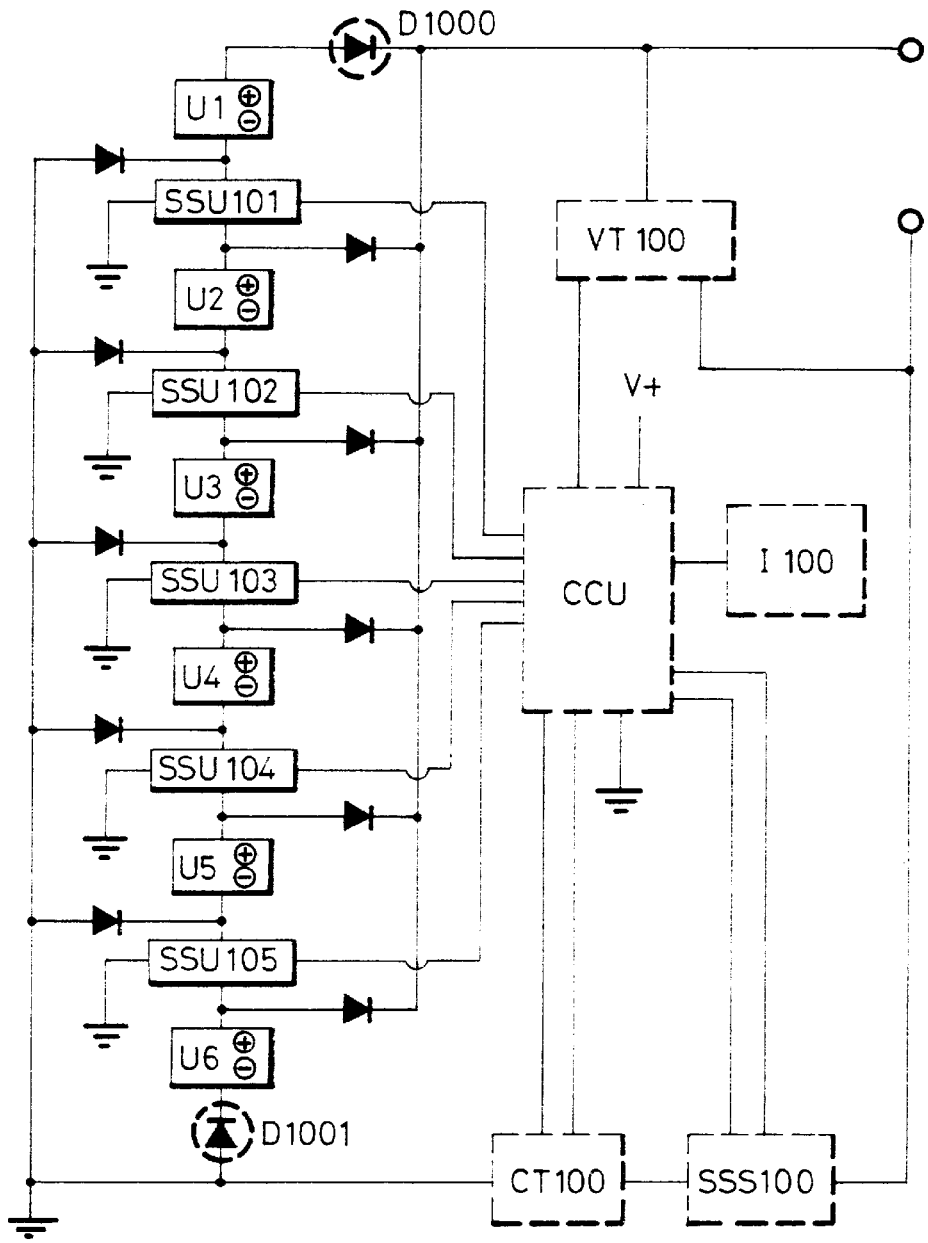
FIG. 6 is a view of multi-voltage switch composed of solid switch and diode.

Moreover, electric-mechanic switch serialized between voltage units in said circuit can be replaced by solid switch member, and connect to diode so as to form multi-voltage output. Referring to FIG. 6, a view of multi-voltage switch composed of solid switch and diode, in this circuit its switching function is the same as that of FIG. 5, in FIG. 6, D1000 and D1001 are diodes for average pressure used to provide battery multipled for average voltage, can be disposed on it when needed, because switch member which is serialized between battery units can further connect to CCU and input unit and output voltage current inspection member to form continual adjustment or output voltage and current control between said graded voltage. In this kind of design, we can further dispose electric-mechanic switch contact on both sides of solid switch member to form SSU101–SSU105. By means of following operation order, it can reduce voltage drop, loss, and heat; the operation order of this circuit is as follows:

At "on" position, the (on) operation of solid switch is before electric-mechanic switch.

At "off" position, the (off) operation of solid switch is after electric-mechanic switch.

Figure 7:
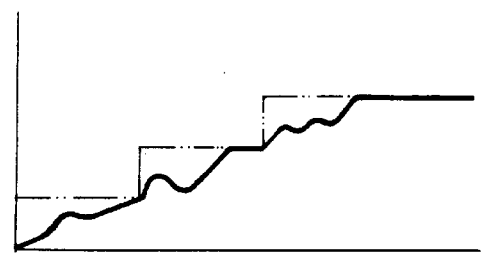
FIG. 7 is a view of linear adjustment voltage wave and graded basic voltage of multi-voltage.

When solid switch is used as linear control or PWM switch control, electric-mechanic switch which is serialized to it will not operate; said solid switch and electric-mechanic switch can be controlled by CCU, or manually, or electric-magnetically, or mechanically, or fluid dynamically controlled, switch operation situation further comprises:

By controlling electric-mechanic switch, it enables output to surplus the needed output value, and then CCU controls driven current of each linear solid switch member, or by means of control over the battery unit which higher potential grade between mutually serialized and multiplized battery units, it provides basic voltage of battery units mutually serialized to solid switch member of resistance so as to attain linear output voltage adjustment. Referring to FIG. 7, if the adjustment of a large voltage of a voltage potential grade is needed, electric-mechanic switch can achieve it so that heat loss will be less;

By operating electric-mechanic switch, it enables the output surplus the needed output value, and then CCU controls it and each solid switch member outputs chopped current, or controls driven current of each linear solid switch member, or by means of control over the battery unit which has has higher potential grade between mutually serialized and multiplized battery units, it provides basic voltage of battery units mutually serialized to solid switch member of driven pulse range so as to attain average output voltage adjustment. For example, CCU controls SSU 101, 102, 104, 105, which are all mutually connected and SSU 103 is controlled by chopped wave and its output is as following FIG. 8, if we want to trim the adjustment of a large voltage larger than a unit of battery units voltage potential grade, we can do it by means of electric-mechanical switch unit, because it has graded basic voltage, ripple-wave value is lower than that of ave-loaded adjustment of the whole voltage directly;

If said linear or chopped wave control ripple range and graded basic voltage are composed of battery unit of equal voltage, in order to seek an average of electric consumption, CCU can further be used to control unit CCU which periodically alternates to control its solid switch member so as to make battery alternate basic voltage supply and adjusting range, or chopped wave pulse to have an average electric consumption.

We can further serialize an inspection device CT100 to the output circuit so as to inspect its output current value feeding back to central processing unit (CCU), according to the input unit instruction or the preset value in CPU, and control mutually and relatively electric-mechanical switch and solid switch, and at the output terminal it multipled inspection device VT100 so as to inspect its output voltage value which feeds back too CPU, and in accordance with instructions of input unit, or with the mutual control of solid switch and electric-mechanical switch of preset value in CCU. Similar to the conventional steady voltage circuit, because this circuit has a standard potential, in addition to adjusting the voltage change caused by unsteady load, it can adjust loaded side voltage change caused by unsteady power voltage. For example, voltage drops in a battery because storage is reduced, or voltage is unsteady in a sun-power battery because sunlight amount is changed.

Besides, said switch member still functions as a switch and add a serialized SSS100 to the circuit and functions as a constant adjusting component between graded voltage of linear and chopped wave control that is, "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output or slowly voltage-rising or slowly dropping, which forms between valley bottom voltage and peak and is controlled by adjustable linear, or PWM of it".

Figure 9:
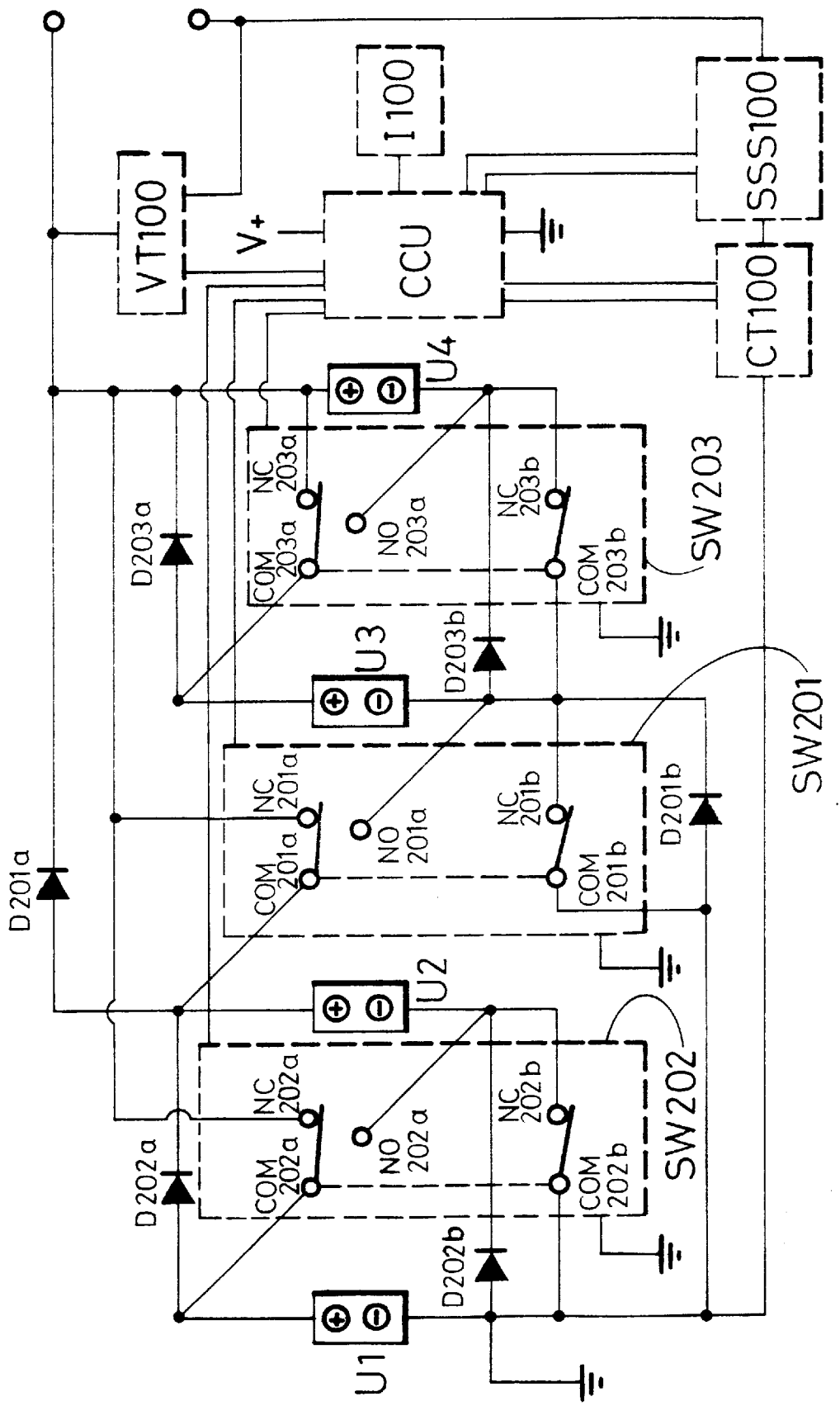
FIG. 9 is a view of multi-voltage circuit composed of branch switch circuit and serial diode.

Another application of said circuit is shown in FIG. 9, an embodiment of serialized multi-voltage circuit, it consists of two sets or more than two sets of battery units of same voltage, same capacity, or at least of same voltage, and by means of branch connected switches to switch on/off and change their serialized and multiplized situation so as to further change their output voltage; when outputting, it will make switch contact multiple series connect to segmented diode's two ends so as to eliminate diode's direct voltage reducing and thermal loss, and it can further combine with current inspection device and linear or switch-mode solid switch member, and combine with a central processing unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/ negative polar on/off switch of output side.

Figure 10:
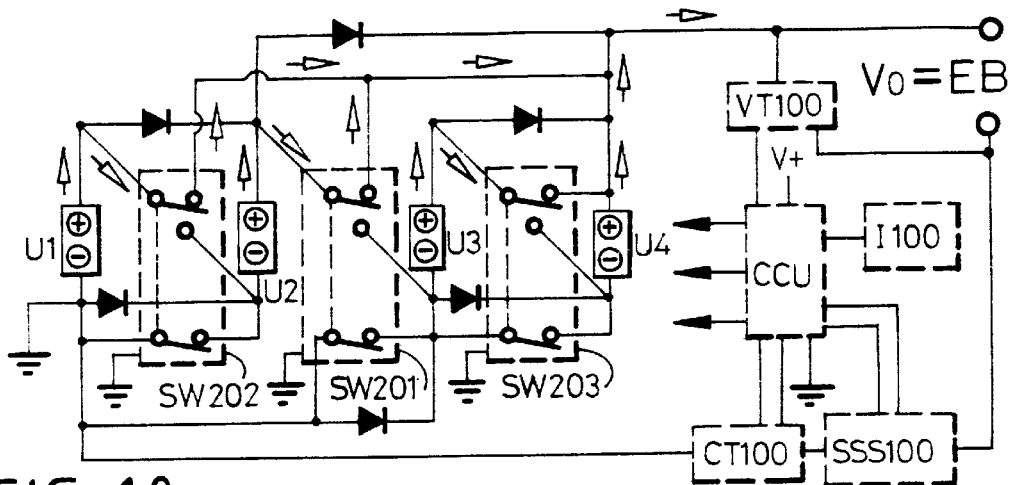
FIG. 10 is a view of low voltage switch circuit of FIG. 9.

The embodiment in FIG. 9 consists of:

Positive pole of battery unit U1 and serialized switch SW202 have common contact COM202a, after mutually contacted, they directly serialize diode D202a, and then connect with the positive pole of battery unit U2, and common contact COM201a of serialized switch SW201, and then further directly serialize with Diode D201a, and then connect to output positive pole;

Negative pole of battery unit U1 connects to output negative end and serialized switch SW202 of the common contact COM202b, and then directly serialized diode D202b; the output positive end of diode D202b further connects to the open No. 202a of switch SW202 and close NC 202b, when common connected to pass to negative of U2;

Negative end of battery unit U1 connects to serialize the common contact COM201b of switch SW201, and then directly serialize diode D201b, the output positive end of diode D201b connects to close contact NC 201b of SW201 and open NC201a and common contact COM203b of serialized switch SW203 and the negative pole of battery unit U3; and then directly serialize diode D203b; the output positive end of diode D203b connects to close contact NC203b of switch SW203 and the negative pole of battery unit U4;

After the positive pole of battery U3 connects with common contact COM203a of serialized switch SW203, they directly connect to serialized diode D203a; the output positive end of diode D203a connects with close contact NC203a of serialized switch SW203 and the positive pole of battery unit U4, and connects to output positive end;

Close contact NC202a of serialized switch SW202 and close contact NC201a of serialized switch SW201 are connected to output positive end;

Said circuit control has the following characteristics:

1. When SW201, SW202, SW 203 do not operate, battery unit U1–U4 connect with switch contact and tend to output low voltage of multiple; that is, 1× battery unit voltage, as shown in FIG. 10, which is partly a circuit view of low voltage output situation in FIG. 9.

Figure 11:
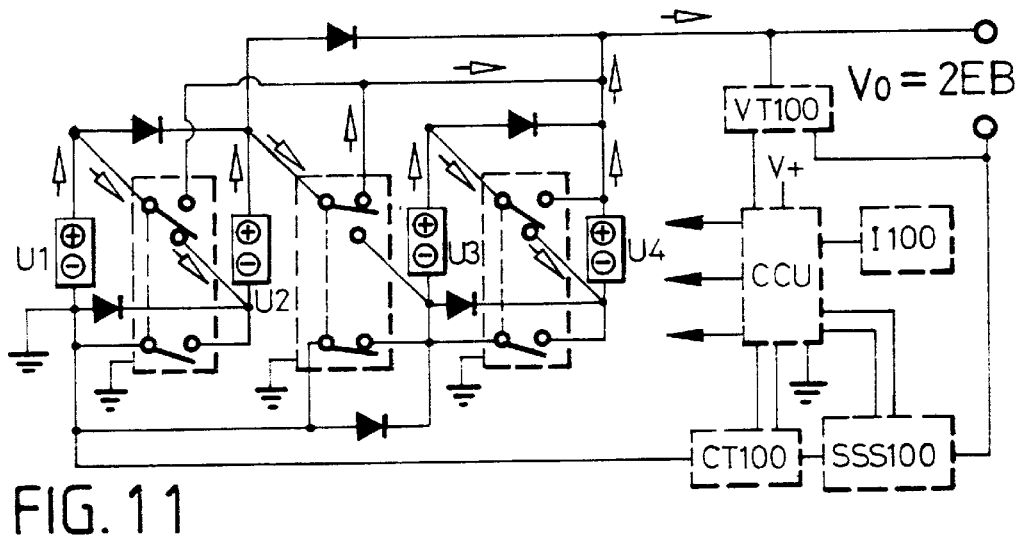
FIG. 11 is a view of intermediate voltage switch circuit of FIG. 9.

2. When SW202, SW 203 are in operation, battery unit U1 serializes with U2, U3 serializes with U4, and then these two are multiplized to output voltage of 2'× battery unit voltage, as shown in FIG. 11, which is a view of output circuit situation of circuit 2'× battery voltage in FIG. 9.

Figure 12:
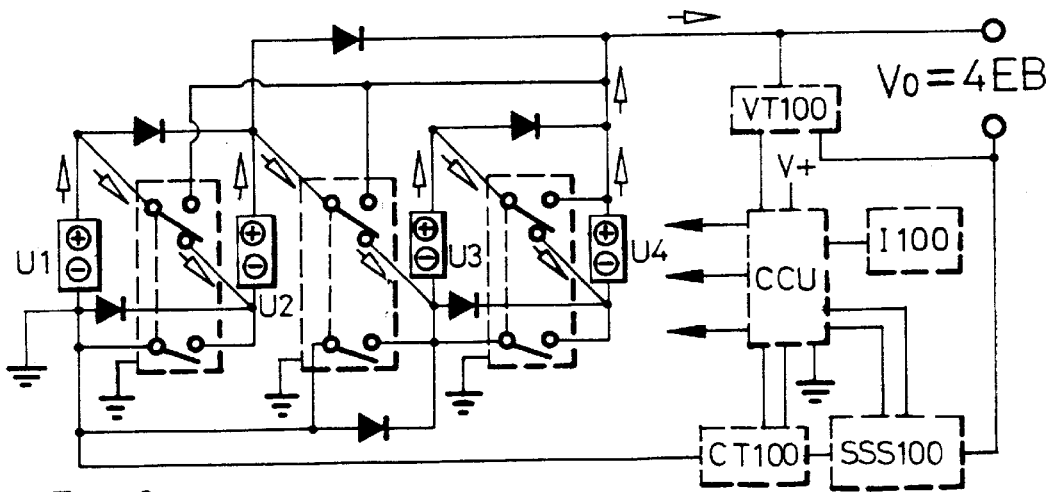
FIG. 12 is a view of high voltage switch circuit of FIG. 9.

3. When SW201, SW202, SW203 are in operation, battery unit U1–U4 are serialized so as to output voltage of 2"× battery unit voltage, FIG. 12 is a view of output circuit situation of circuit 2"× battery voltage in FIG. 9.

By means of the said circuit in the embodiment, we can use common divisor to make an analog and promote it. One of the characteristics of this circuit is to conduct the multiple devices for diode and contact, to produce sparkle of switching voltage potential differences at two ends of contact grades when contact is switch, and to eliminate diode to directly drop voltage and heat loss.

Figure 13:
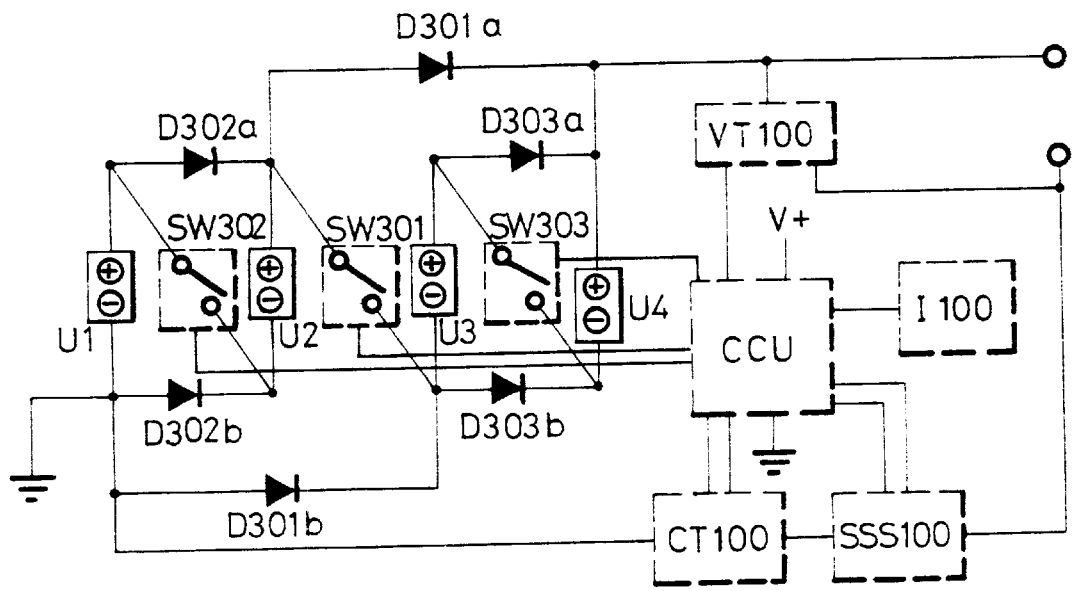
FIG. 13 is a view of multi-voltage switch circuit of single-throw switch combining with diode.

FIG. 13 is a view of multi-voltage switch circuit of single-throw switch combining with diode, and it can further combine with current inspection device and linear or switch-mode solid switch member, and combine with a central processing unit (CCU) to accept operation order of input device instruction so as to control electric-mechanical switch and solid switch member for adjusting the output voltage, or set the limits of output current value, and "by means of linear adjustment or solid switch member of PWM adjusting control which is disposed serially in battery and diode and between their on-off switches of switch multi-voltage output, the low pressure becomes valley and high pressure of second section becomes peak for the circuit of linear continual adjustment and PWM adjustment of output voltage, and becomes the low ripple-wave voltage output which forms between valley bottom voltage and peak and is controlled by adjustable linear, or PWM of it", or when electric-mechanical switch is turned on, the time of operation of solid switch (on) is suspended at the on position, when it is turn off, the operation time of solid switch (off) precedes the electric-mechanic to cut off power supply and reach the non-sparkle on-off electric-mechanical switches. This function further comprises the non-sparkle turning on/off of positive/negative polar on/off switch of output side; in this embodiment, circuit shown in FIG. 9. combines with current inspection device and linear, switching, solid switch member and combines with a central control unit CCU, and changes SW201, SW202, SW203 into single-polar open switch and multiples respectively from SW301 to the positive pole of battery unit U1 and negative pole of U2, from SW303 multiple connecting to positive pole of U3 and negative pole of U4 of battery unit; diodes D301a, D301b, D302a, D302b, D303a, D303b are the same as the connecting line in FIG. 9, except the serialized switch can not eliminate the direct drop voltage of diode, all other functions are also the same as the circuit shown in FIG. 9.

We can further use linear and switching solid switch member SW401, SW402, SW403, to replace said switch SW301, SW302, SW303.

Figure 14:
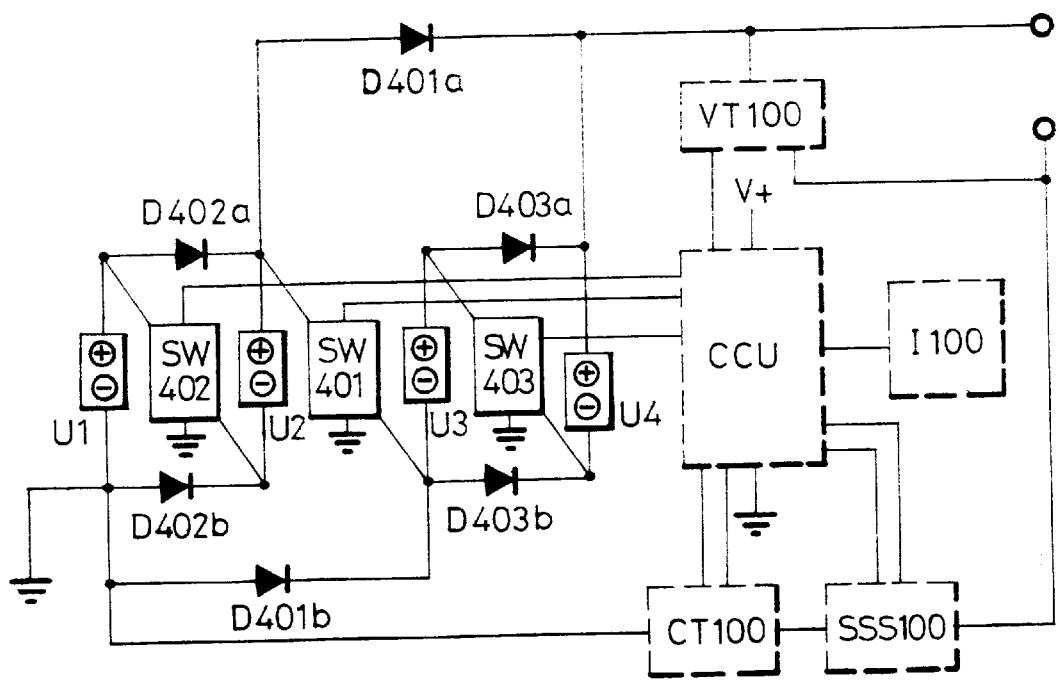
FIG. 14 is a view of multi-voltage switch circuit composed of solid switch member.

Referring to FIG. 14, a view of multi-voltage switch circuit composed of solid switch member, the disposition and function of diodes D401a, D401b, D402a, D402b, D403a, D403b are the same as the circuit in FIG. 9 and FIG. 13, the switch function of this circuit is the same as that in FIG. 13.

Besides, said switch member still functions as a switch and add a serialized SSS100 to the circuit and functions as a constant adjusting component between graded voltage of linear and chopped wave control.

The embodiments in. FIG. 9–FIG 14 are battery units which have many advantages. For example, their control over the circuits is suitable for multi-voltage control of multiple independent DC power of alternate and commutation, elimination of sparkles, and constant adjustment between feedback control and linear or chopped wave graded voltage of voltage and current; in application, individual and independent DC voltage unit can be considered and used as a battery unit.

According to each said application theory, in practical uses, switch member between each battery unit can also use electric-mechanic switch and solid switch member in accordance with needed function and economy.

Figure 8:
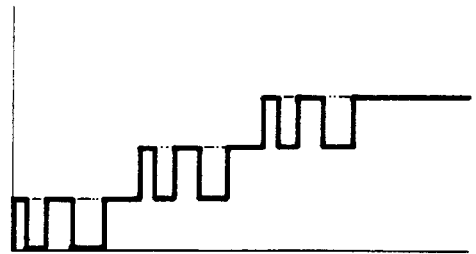
FIG. 8 is a view of chopped-wave adjustment voltage wave and graded basic voltage of multi-voltage.
Figure 15:
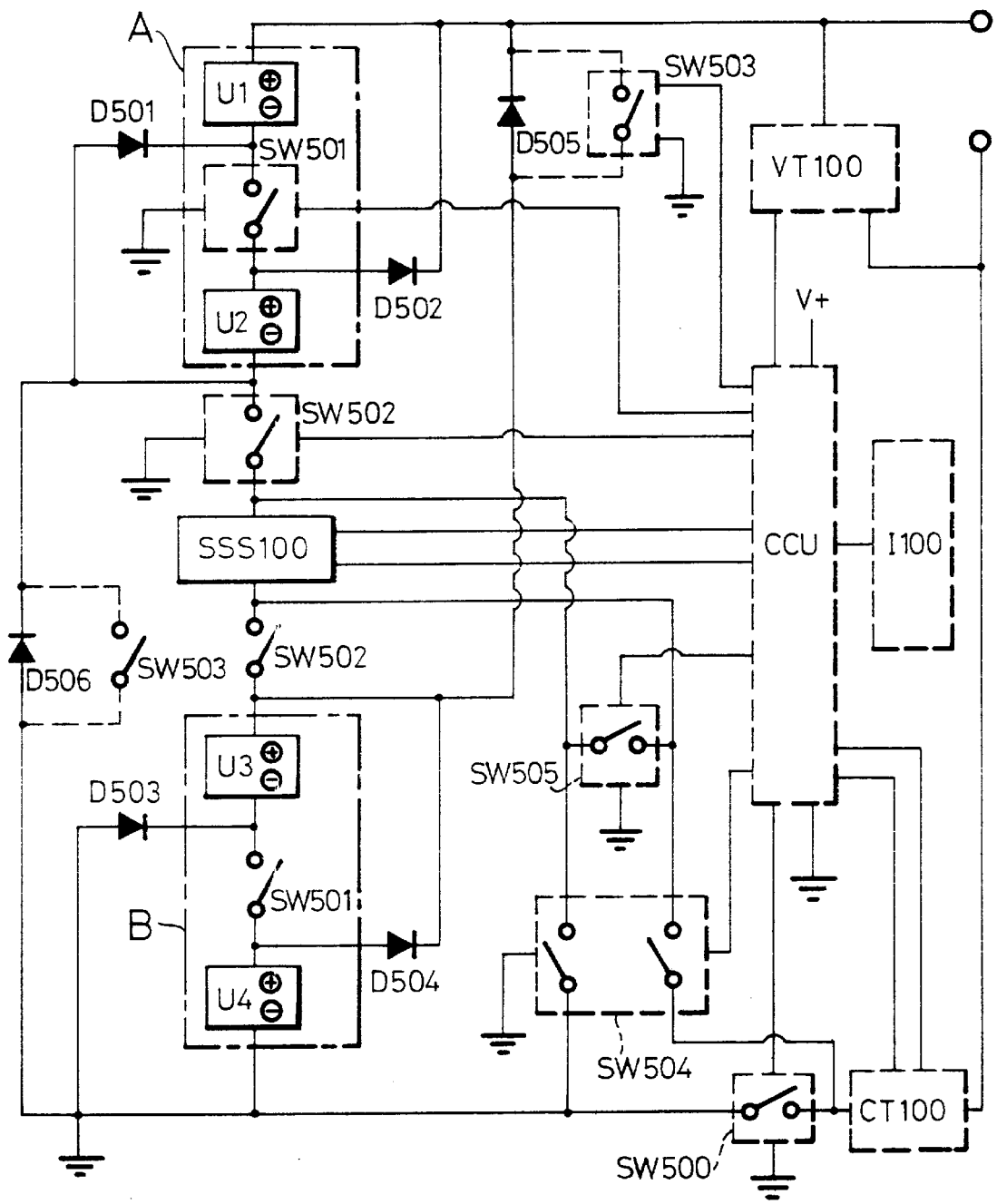
FIG. 15 is a circuit embodiment of an off-on switch for control over a commonly used solid switch member.
Figure 17:
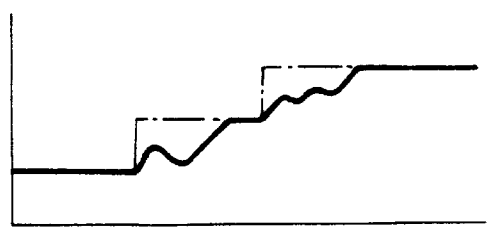
FIG. 17 is a wave form diagram of linear adjustment output voltage in FIG. 15.
Figure 18:
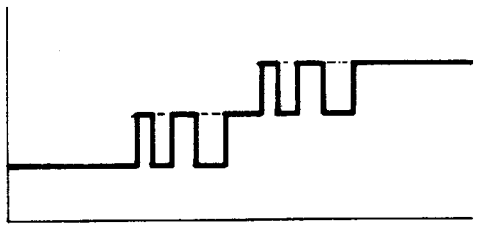
FIG. 18 is a wave form diagram of chopped wave adjustment output voltage in FIG. 15.

If said embodiments determine to use single unit solid switch member for linear or chopped voltage control output between each gradient voltage (as shown in FIGS. 7,8), they can attain this goal by means of circuit shown in FIG. 15. Their main structures are as follows:

two sets or more than two sets of power units of same voltage and same capacity, or at least of same voltage, and a set of commonly serialized solid switch member, whereas solid switch member is serialized in the middle section; that is, the number of power units serialized in front section and rear section is the same;

constantly open serial switched are disposed on each serial member, serial switch member of its both ends are both switches contact points of the same set of synchronously driven serial switches, (or not the same synchronously driven serial switches), the contact point relationship of forward and backward serialized switches of power unity, having synchronous relationship;

solid switch has on-off switch for selection of output control and for output switch serialized at output end; that is, when all power units tend to be multiplized, solid switch is turned on or off to provide replacement of output switch and to control and adjust output current for linear or chopped wave voltage; if linear or chopped wave adjustment functions of output gradient voltage do not involve all power units, and tend to be in serialized situation, its output will be as illustrated in FIGS. 17,18, then said on-off switch can be viewed as necessary to make diverse choice—whether it will be disposed or it will be replaced by adding serial switch contact points between solid switch and power unit;

each power unit which is respectively divided into front section and rear section by solid switch has a polar end which directly connects through a diode or switch to two output ends of different polarity, and another polar end of power unit in front and rear section is serialized through diode or switch, that which belongs to the front section is commonly serialized and then guided through diode or its serialized control switch to the directly connected output end of rear section, that which belongs to the front section is commonly serialized and then guided through diode or its serialized control switch to the directly connected output end of front section;

auxiliary switch is serialized to the power connecting end of solid switch member, when solid switch is in completely conducted situation, the auxiliary switch will close to eliminate voltage drop and thermal loss, this switch is devised for diverse choice;

CCU unit, input control, set device, voltage and current control device can be used to control said members for the choice of output voltage and current or choice of limit voltage, limit current, constant current, slowly rising, slowly dropping voltage output.

Figure 16:
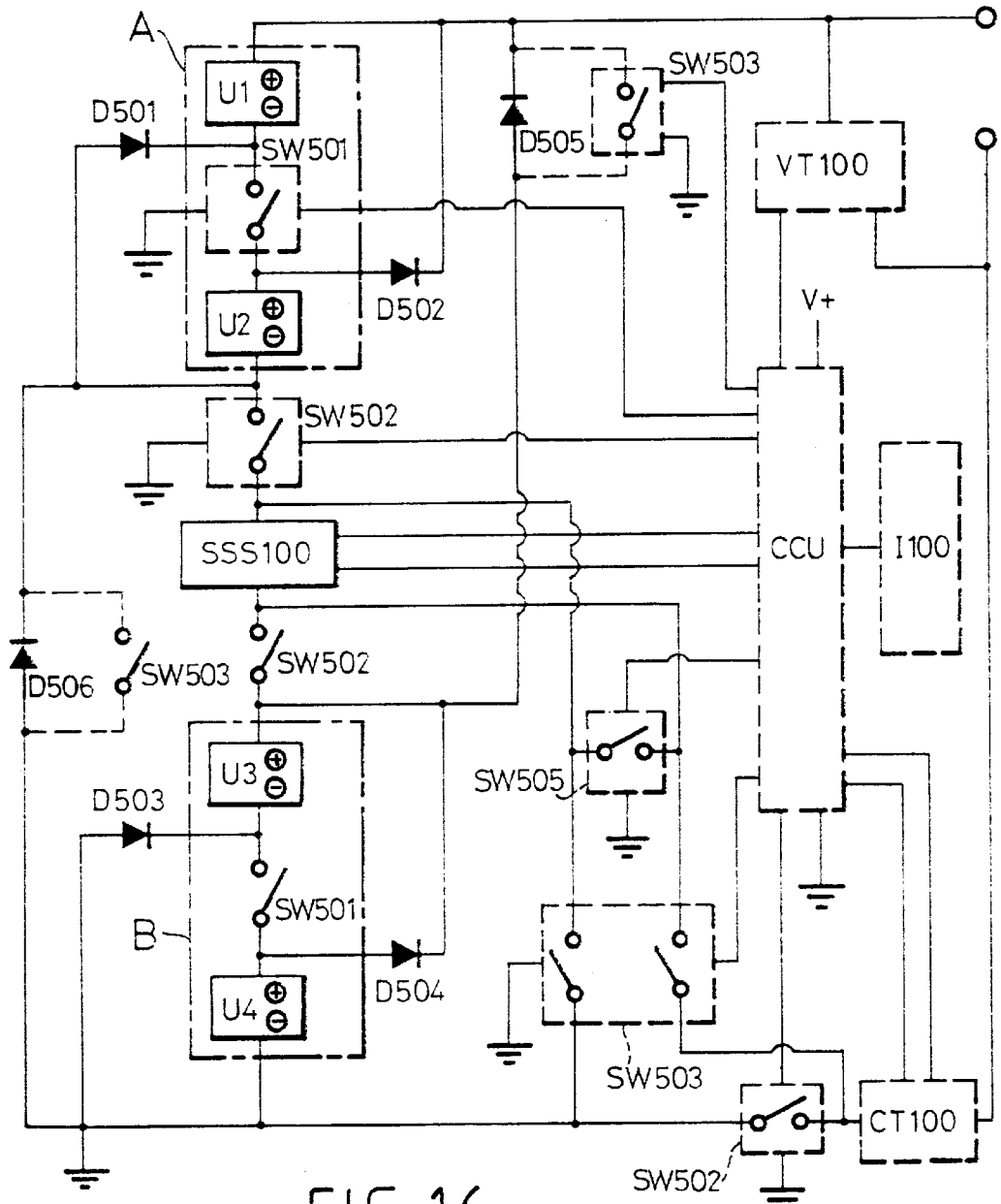
FIG. 16 is a circuit embodiment of the off-on switch in FIG. 15 which is replaced by multiple control switch additional contacts and output switch is replaced by serial control switch additional contact points.

As illustrated in FIG. 15, a circuit embodiment of an off-on switch for control over a commonly used solid switch member, the single unit solid switch member of the circuit can adjust linear and chopped wave between each gradient voltage, in this FIG., two or more than two sets of power units U1–U4 of same voltage, same capacity, or at least of same voltage for the supply of gradient on-off switch power source, including: [1]. U1, U4 serial for EB output; [2]. U1, U2 tend to be serialized and then multiplized with series U3, U for 2× EB output; [3]. U1–U4 are serialized for 4× EB output; in the circuit among each power unit there disposed a control switch SW 501 and SW502, among the negative end of power units U1, U2 there mutiplized negative end of current-conducting diode D501, U2, and among output negative ends is multiplized another current-conducting diode D506, both ends of the diode can be further serialized to a switch set SW503 which will close when power units are multiplized so as to eliminate thermal loss of diode D506, a diode D503 is also multiplized between power unit U3 and an output negative end; another diode D504 is multiplized between positive ends of power units U3 and U4; another diode D505 is multiplized between positive end of power units U4 and positive end of output; both ends of these two diodes can also be multiplized to switches SW503 so that it can close when all power units are multiplized and that it can eliminate the thermal loss of diode D505, a diode D502 is also multiplized between power unit U2 and an output positive end; between serial points of half set of power units there serialized a solid switch SSS 100 and at the independent constant open contact points of two sets of SW502, two power ends of solid switch are respectively serialized to output two independent constant open contact point sets of control switch SW504, and then respectively connect to both contact ends of output switch SW500, output switch SW500 is serialized to an output circuit, its relation with solid switch lies in that when it adjusts its linear and chopped wave between gradient voltages to fit the operation of SSS100, SW502, SW503, it turns on and turns off output switch SW500 so as to let output current pass by, especially when power units tend to low-pressedly multiplized all, and when solid switch member adjusts output power, SW500 tends to open its circuit, and output of solid switch controls to turn on and off the switch SW504, in output circuit, polar series solid switch initiates linear or chopped wave output of low-pressure section; but in low-pressure section, it continually initiates the largest amount of output; output switch SW500 can be further closed to eliminate the loss of pressure-drop, if this function is not needed, output switch SW500 can be replaced by a set of constant open contact point which is added from series control switch SW502, and output switch 504n of the solid switch can also be replaced by two sets of independent constant open contact point added from series on-off switch 503.(as shown in FIG. 16). Besides, if auxiliary switch SW505 which is further added and multiplized to both contact ends of SSS100, it can be provided to close contact points of the auxiliary switch when solid switch SSS100 is completely conducted in every gradient voltage range so as to eliminate pressure-drop and thermal loss.

Said circuit is serially and multiply switched among each power unit so as to gain multiple voltage output, so the number of power units can be enlarged to gain more gradient multiple voltage output, its basic theory of switch can be fulfilled according to the methods illustrated in FIGS. 1, 4, 5, the only difference lies in that the series sets of its power units are averagely divided into two symmetric series sets A, B, one end of power unit of each set is respectively connected to both output ends of different polarity by means of diode or switch, another end of each set is respectively connected both ends of solid switch SSS100 which is serialized to the independent constant open contact points of an on-off switch, and then is connected to the same polar ends of the same set of independent power units by means of diode or on-off switch, as illustrated in FIG. 15, the negative end of A set is connected to negative output end or additional switch SW 503 by means of conductive diode D506 so as to connect to output negative end, when power unit initiates parallel low-pressure output, and connects to the negative end of the same set U1 by means of diode D501, the negative end of A set is connected to negative output end or additional switch SW 503 by means of conductive diode D505 so as to connect to output negative end, when power unit initiates parallel low-pressure output, and connects to the negative end of the same set U4 by means of diode D504; in practical uses, diode or control switch or both of them, can be freely selected to be used as current-conducting elements among power units, if two-phase current-conducting element is selected, the circuit structure can supply power or initiate inverse-phase input of charge, when two-phase solid switch is also selected, it can further adjust input linear or chopped wave;

Chart 1 shows the states of each switch.

Figure 19:
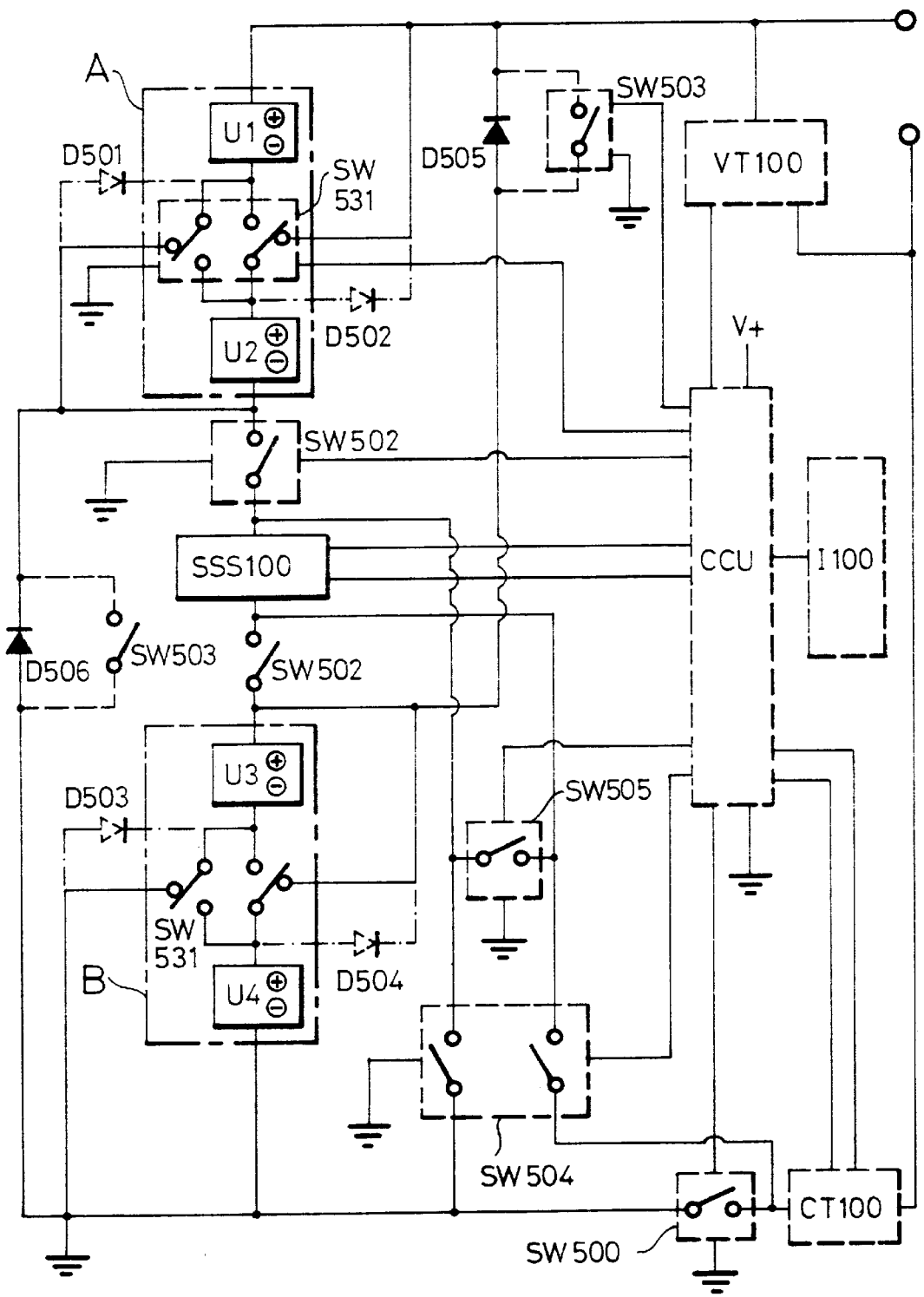
FIG. 19 is a circuit embodiment of a serial control switch replaced by two-knife two-throw switch.

As illustrated in FIG. 15, an embodiment of the invention in operation, if output current is larger, diode will lose its power and become hot, because of directional pressure-drop. In order to avoid the thermal loss and pressure-drop, initial control switch SW501 can be replaced by the same two-knife two-throw control switches SW531, as shown in FIG. 19, and if there is no request for output adjustment when low-pressure parallel is output, as shown in 20, SW 500 is replaced by switch SW502, and SW 503 replaces SW 504, if it is necessary the embodiment in FIGS. 19, 20 can add parallel branch current diode between common contact points and constant open contact points of two-knife two-throw switch, as shown in FIG. 20, and can reduce sparks when it is cut off, its theory is the same as the embodiment in FIG. 1.

Said circuit is used for sparkless on-off order control, and used for adjusting voltage or current control. (including slow pressure-increasing or slow pressure-reducing, or constant voltage, or slow current increasing, or slow current-reducing, or constant current, or inspection limit current), each function is the same as said embodiment, and do not need to be mentioned again hereafter.

Figure 20:
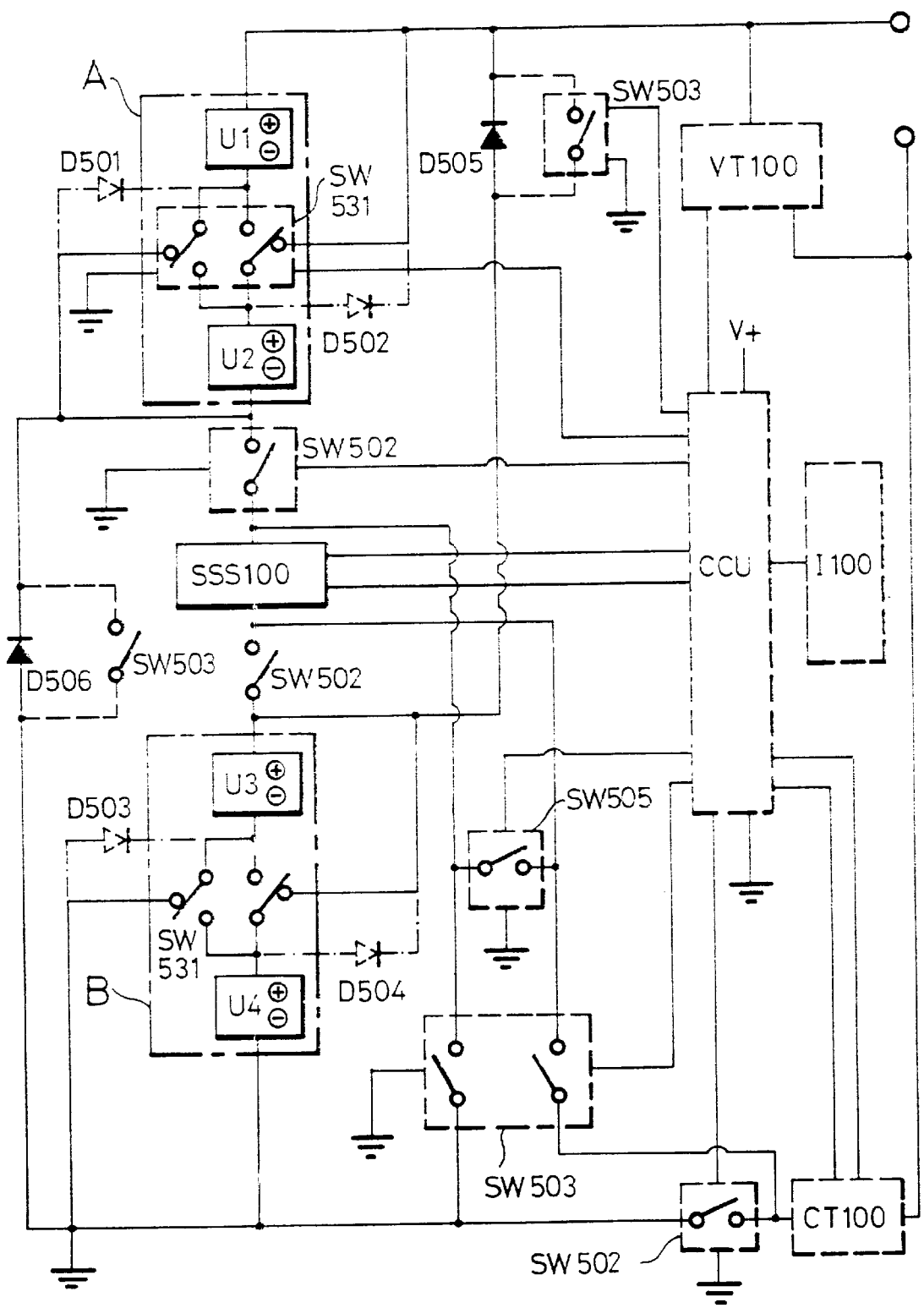
FIG. 20 is a circuit embodiment of the off-on switch in FIG. 19 which is replaced by multiple control switch additional contacts and output switch is replaced by serial control switch additional contact points.
Figure 21:
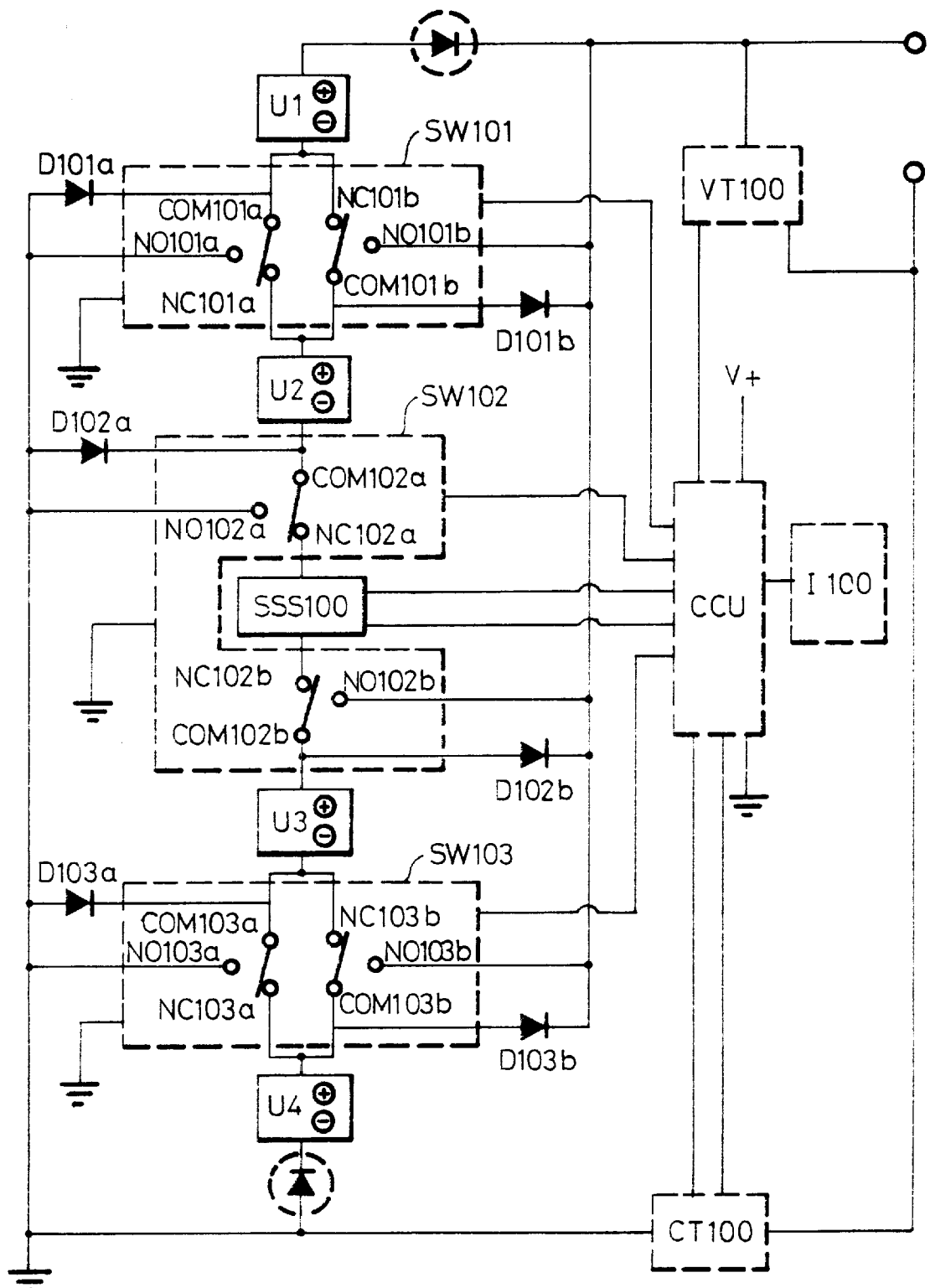
FIG. 21 is the first economy circuit embodiment which has a linear or chopped wave adjustment function when it is beyond basic voltage.
Figure 22:
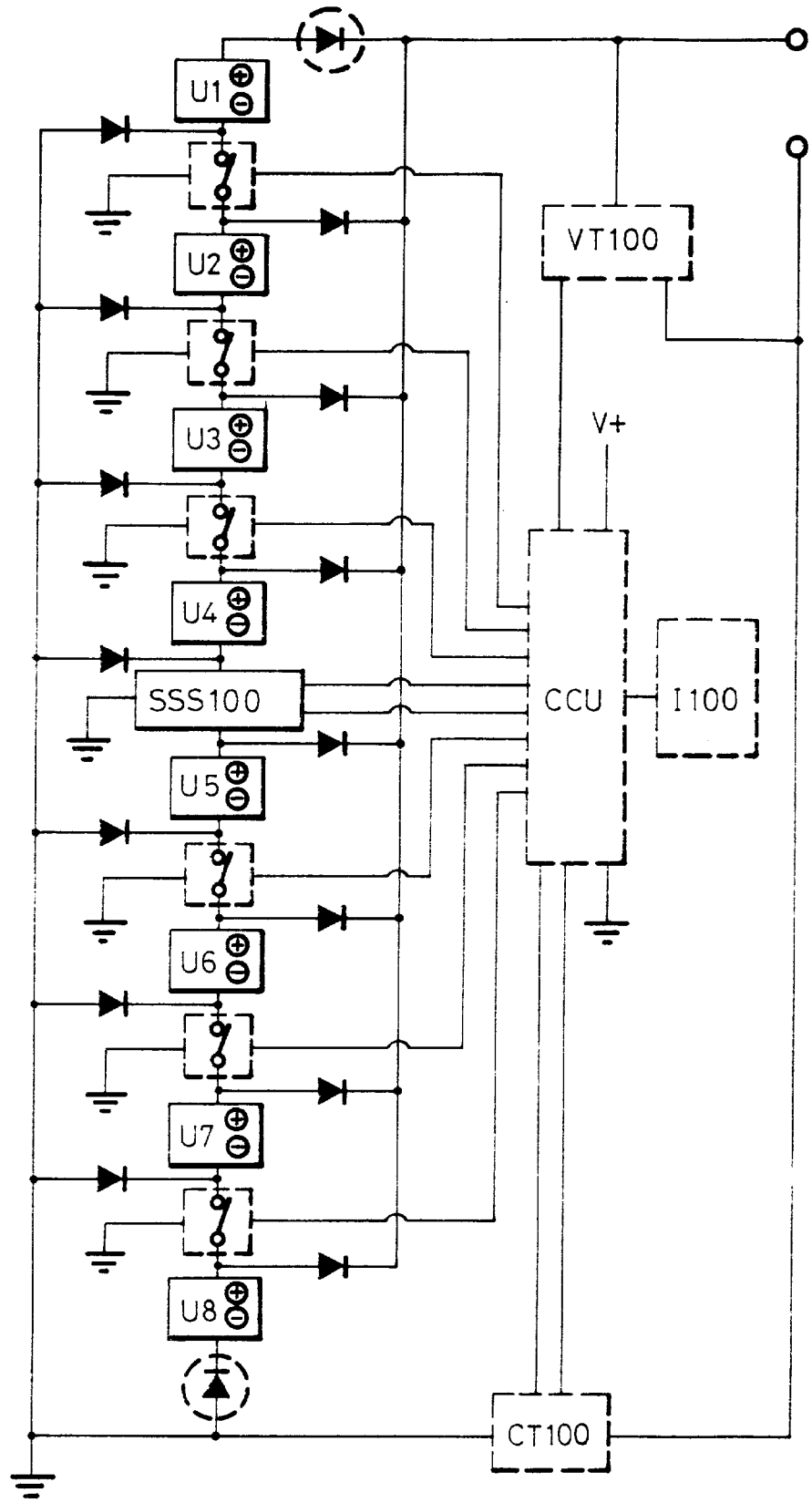
FIG. 22 is the second economy circuit embodiment which has a linear or chopped wave adjustment function when it is beyond basic voltage.
Figure 23:
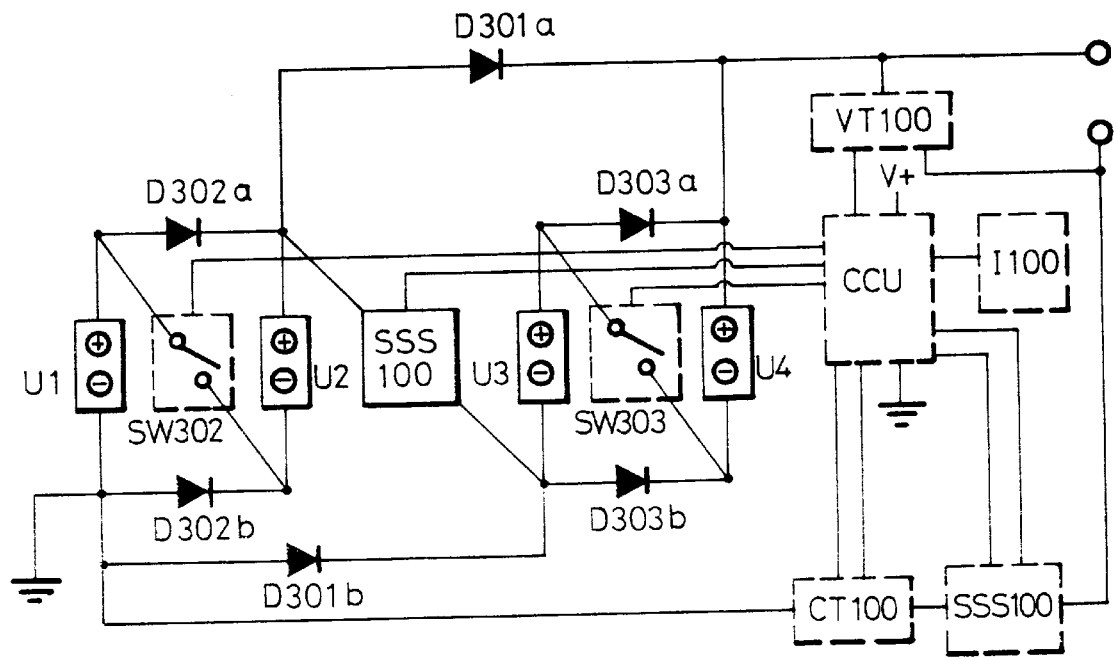
FIG. 23 is the third economy circuit embodiment which has a linear or chopped wave adjustment function when it is beyond basic voltage.

Besides, as far as economy is concerning, economy circuit, as illustrated in FIGS. 21–23, forms Multi-voltage Driven Circuit of Battery or Multiple Independent DC Power;

As illustrated in FIG. 21, which is based on FIG. 20, two-knife two-throw switch replaces SW 502 in FIG. 20, and omit SW 503 so as to multiplized respectively both input ends to the divide diode which is connected to positive and negative poles of power units, its theory of operation is the same as FIG. 1, however, two ends of solid switch member are serialized to synchronous switches SW102 which are serialized to the middle section of power units.

As illustrated in FIG. 22, another embodiment of the economic circuit, and an extension of FIG. 5, the functions of its circuits are the same as illustrated in FIG. 5, except that the middle section of power units has solid switch member SSS100 for the adjustment of linear or chopped voltage.

FIG. 23 is an embodiment of the extension of the circuit as illustrated in FIG. 13, except that the switch SW301 in FIG. 13 is replaced by solid switch member SSS100 to adjust linear or chopped wave voltage, all of the rest functions are the same as illustrated in FIG. 13, and it further controls its multi-voltage output voltage value during the period, or half the period of polar exchange.

In practical uses, multi-voltage control circuit of each said circuit, except that it can be directly transmitted to the loaded or reverse output which can accept preserved energy, can further combine with bridge switch member and output the AC approximate sine by means of the following control process, a similar function that single DC voltage transforms to AC circuit has been a conventional type and need not be mentioned here again. Here, the invention designs a controllable multi-voltage to combine with conventional bridge switch circuit for forming an approximate sine AC output by means of specific gradient multi-voltage so as to substitute the conventional high-cost low-efficiency way of voltage wave form series by means of transformers and alternators, its structure and control includes the circuit controlled by bridge switch circuit and gradient voltage synchronous control; it can be described as follows:

phase-exchange circuit sets, which is structured by four sets of bridge connected box fluid, power crystal, or electro-mechanical switch members, have output ends multiplized and loaded and input ends which is connected to multi-voltage driven circuit Po of said battery set or independent DC power supply, bridge switch member is control by CCU so that when its two switch member sets SWF are in ON position, currents are directionally through load, and another two switch member sets SWR are in ON position, currents are reversely through load, and results in a function of periodic exchange;

each directional conducting current period includes multi-voltage power supply turning from zero to low, and from low to high, and then from high to low and then from low to zero, and exchanging directions and repeat the circle mentioned above, and gaining a DC output of approximate sine.

Figure 24:
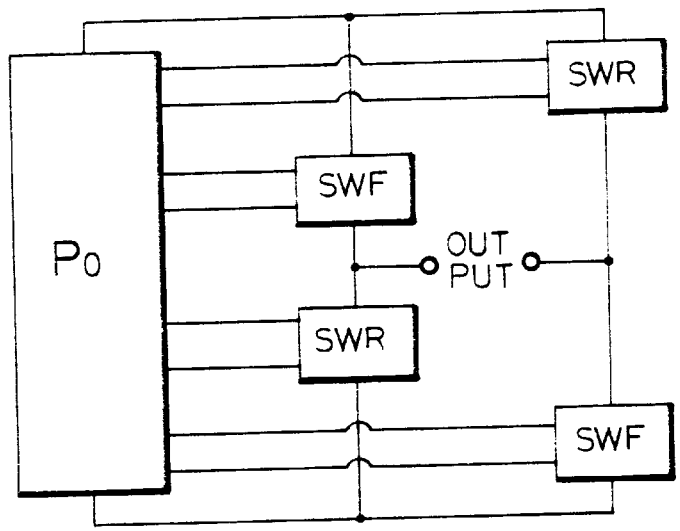
FIG. 24 is a circuit square diagram of multiple voltage control circuit of the batteries or the multiple-units independent DC power supply which by means of bridge switch result in DC to AC approximation of sine output.
Figure 25:
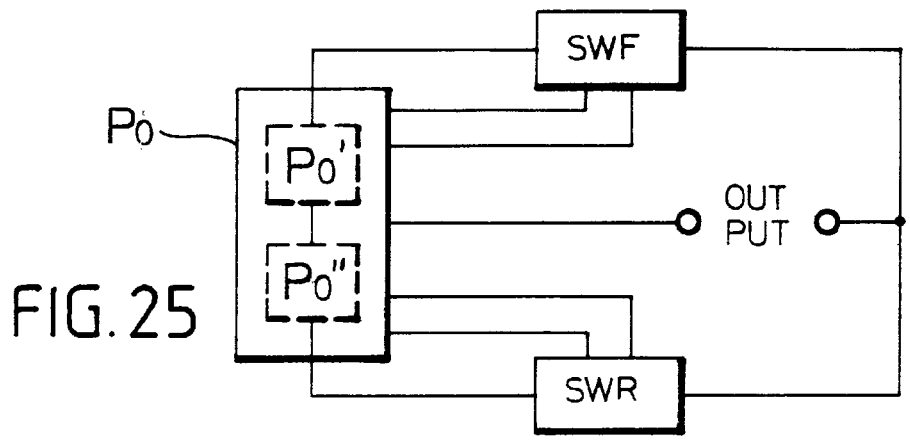
FIG. 25 is a circuit square diagram of multiple voltage control circuit of the batteries or the multiple-units independent DC power supply which by means of two-set DC circuit and output switch result in DC to AC approximation of sine output.
Figure 26:
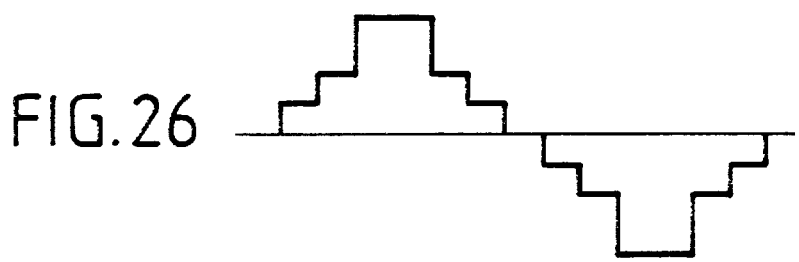
FIG. 26 is a wave form embodiment of multiple voltage control circuit of the batteries or the multiple-units independent DC power supply which by means of bridge switch member result in synchronous periodic approximation of sine AC output.

Said circuit can be formed into a bridge circuit (as shown in FIG. 25) by serializing a plurality of power units and by disposing middle series sampling head and two sets of switch members; that is, use two sets of batteries or multi-voltage driven control circuit series of several sets of independent DC power source to form Po, and from its central serialized points, it head-samples to connect to the loaded end, said bridge switch member can be formed by two sets and one set SWF is serialized to the positive end of power units, the other set SWR is serialized to the negative end, the other end of the two switch member together are connected to the other side of the load by means of mutual conducting said two switch to form polar exchange between loaded voltages, and to fit said each directional conducting current half period including multi-voltage power supply turning from zero to low, and from low-to high, and then from high to low and then from low to zero so as to form approximate sine AC output, as illustrated in FIG. 26, a wave form drawing of FIGS. 24, 25.

Said circuit can be an output form of single-unit, single-phase, or multi-unit multi-phase difference.

Besides, according to the need for load, power wave forms includes triangular, rectangular, recessive, calculus, integral wave form, each wave form has its own use. We may directly output DC pulse by controlling over the wave form that is needed for approximation in multi-voltage output order by means of CCU, or by synchronously fitting the polar exchanging bridge circuit to said specific exchanging output.

Again, power units of this system can supply and store power, so two-phase conducting element can be used to switch series-multiplize control over power units, and to adjust solid switch element of voltage and current, and two-phase conducting element or inverse device can be used to adjust the coupled mating with multi-voltage control circuit fitting to power supply input from outside by this battery sets or several sets of independent DC power supply.

Said circuit can be further formed into DC to DC converter or initiates the dynamic feed back function by means of changing its series-parallel situation so as to accept different voltage input and different voltage output respectively, it includes the following forms:

1. low-pressure input, high pressure output.
2. high-pressure input, low pressure output.
3. same pressure input, same pressure output.
4. long time small current input, short time large current output.
5. short time large current input, long time small current output.
6. power unit is structured by battery or capacity for mutual DC input-output operation
7. initiate AC output by fitting DC input to bridge switch circuit.

Figure 27:
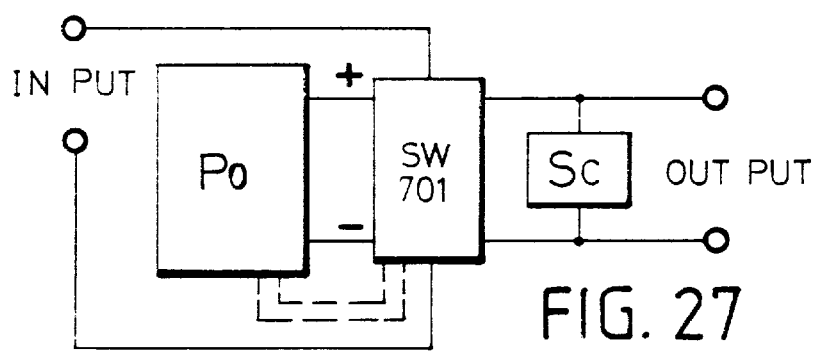
FIG. 27 is a AC to AC alternating current circuit embodiment of multiple voltage control circuit of the batteries or the multiple-units independent DC power supply which have two-phase contact off-on switch circuit and additional output storage member.

As illustrated in FIG. 27, its main structure is as follows:

power unit Po, which can initiate multi-voltage control output by means of two-phase series-parallel switch, forms Po and then serializes two-phase distribution control switch SW 701 to Po and between output end and input end, switch SW 701 is structured by electro-mechanical or solid element to accept the control from CCU and to provide selection of connecting with power unit for the output of multi-voltage or for dynamic feed back from output end, and under special situation initiates connection between input end and output end;

if the output is a DC output, it can be viewed as if it needs to dispose auxiliary storage battery, such as SC storage battery, capacitor, etc.; if an AC output, it needs to dispose parallel LC resonant storage device of electric inducing and capacity.

Figure 28:
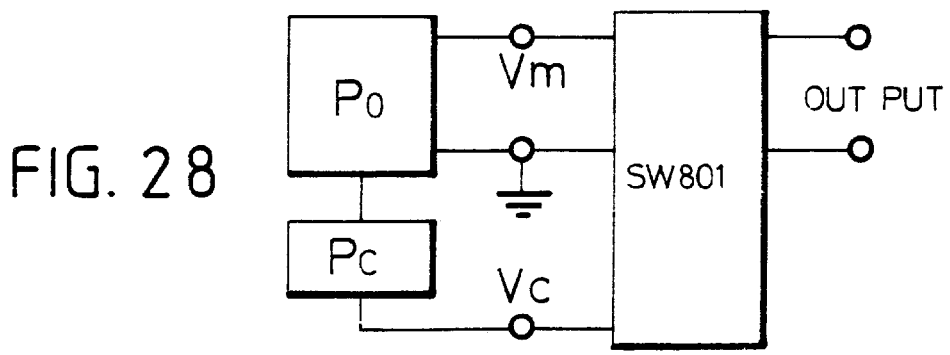
FIG. 28 is a circuit square diagram of auxiliary power unit of additional single set or controllable multiple voltage which combines with main power unit to result in cross multi-gradient voltage output.

In the said multi-voltage switch circuit, if its multi-voltage output does not combine with linear or PWM adjusting switch member, it will be limited by the grades of its common divisor, so we can change the multi-voltage gradient changing power by means of directional polarity serializing to basic power (as illustrated in FIG. 28), its main structure is as follows:

main power unit Po structured by power unit, CCU, and control interface has a positive output end Vm and a negative end which is an earthing end;

auxiliary power unit PC is directionally polarly serialized to earthing side (or positive end), another output end is a VC (Vm) which combine with said main power unit to form an output two tensions connected to distribution control SW801;

distribution control switch SW801 can switch output end to be multi-voltage Vm+VC or multi-voltage Vm, or single VC so as to increase its output multi-gradient phases;

if said VC needs to combine with other load, it can be selected to enlarge its capacity according to its need;

said circuit may accept each wave form DC input, and may output needed wave form by means of control output on-off switch;

The control process of said application forms said switching function by means of CCU to control power unit to combine series-parallel switch member; we may device a DC to DC convertor, a DC UPS of different input-output voltage or DC to AC UPS, or charger, electro-chemical equipment, electric soldering machine, and other DC power suppliers.

To illustrate the function of this circuit, the following example is given; IF 12 sets 12V of storage battery can form the circuit in FIG. 22 and an auxiliary battery is added to it, then its initial output is:

1. 12 sets parallel output 12V,
2. very 6 sets multiplized and then serialized and output 24V,
3. every 4 sets multiplized and then serialized and output 36V,
4. every 3 sets multiplized and then serialized and output 48V,
5. every 2 sets multiplized and then serialized and output 72V,
6. every sets multiplized and then serialized and output 144V, When auxiliary battery is added on it, it increases potential grades, such as 6V, 18V, 30V, 42V, 54V, 78V, 150V.

In practical uses, we select voltage of auxiliary power unit according to our need, or we multi-gradify auxiliary power unit as the main power unit to increase multi-gradification of multi-voltage and reasonablize changing rate between each grade; in this application, said main power unit, auxiliary power unit also include storage battery, fuel battery, thermal battery, or other electro-mechanical battery, or sun-power battery, or AC power supply rectified DC power unit.

In conclusion, object of the present invention is to provide an effective newly designed circuit which can output graded multi-voltage, and further combine with linear or chopped solid switch member so as to attain non-sparkle multi-voltage switching and low ripple-wave PWM voltage output of graded linear or chopped wave and further feedback the limited current or set voltage output adjustment function, and further use two-phase solid switch member to control inverse input voltage current value so as to protect circuit or further fit with conventional bridge switch member positive-negative output interface, and in each half period, let the circuit complete the output from low to high and then from high to low potential of periodic output, by means of the synchronous relation between these two, gain approximate sine AC output, and further control multi-voltage output voltage value during its polar exchanging period and each half period; it is so unique, newly designed, and practical, please examine it in accordance with the law.

What is claimed is:

1. A power unit with controlled output voltage comprising a plurality of substantially identical independent DC power supplies which are interconnected by a central control unit in a series or parallel arrangement for providing a required output voltage on a pair of output terminals in a wide range of output voltages, the output terminals including a positive and a negative output terminals, respectively, and wherein each independent DC power supply has a positive and negative terminal, respectively, said power unit further comprising a plurality of switching means, each of said plurality of the switching means being connected between the negative terminal of one of said plurality of the independent DC power supplies and the positive terminal of a respective succeeding independent DC power supply, such that each of said plurality of the switching means is controlled by the central control unit to provide a series or parallel connection between said independent DC power supplies, wherein the power unit further comprises a plurality of pairs of diodes, each pair of diodes being associated with a respective switching means, wherein each pair of diodes has a first diode and a second diode, and wherein each of the diodes has a positive terminal and a negative terminal, respectively, wherein, in each pair of the diodes, the first diode is connected by its positive terminal to both the respective switching means and the negative terminal of said one of the independent DC power supplies, and the second diode is connected by its negative terminal to both the switching means and the positive terminal of said respective succeeding independent DC power supply, wherein the negative terminals of all first diodes are connected to ground, and wherein the positive terminals of all second diodes are connected to the positive output terminal, and wherein the power unit further includes means controlling at least one of said plurality of the switching means for controlling a magnitude and a shape of the required output voltage, said means being controlled by the central control unit.

2. The power unit of claim 1, wherein each independent DC power supply provides a terminal voltage EB, wherein the required output voltage may have a value of N×EB, wherein N=1, 2, 3 . . . , wherein an unwanted disturbance of the shape of the output voltage and an undesired sparking while switching from one value of the output voltage to another value of the output voltage may take place during a series-parallel re-arrangement of the independent DC power supplies, said means for controlling a magnitude and a shape of the required output voltage includes at least one solid-state switch controlling at least one of said switching means to operate in a predetermined order, thereby providing a non-sparking switching and low-ripple output voltage.

3. The power unit of claim 1, wherein said switching means includes a solid-state switch.

4. The power unit of claim 1, wherein the output voltage may be of a linear, chopped or pulse-width-modulated shape.

5. The power unit of claim 1, wherein said switching means includes an electro-mechanical switch having first and second common contacts, first and second normally closed contacts, and first and second normally opened contacts, respectively, such that in each electromechanical switch the first common contact is connected to the second normally closed contact, and the second common contact is connected to the first normally closed contact, wherein said electro-mechanical switch is connected between said one and said succeeding independent DC power supplies, such that the negative terminal of said one of the independent DC power supplies is connected to both the first common contact and the second normally closed contact of the electro-mechanical switch, respectively, and the positive terminal of said succeeding independent DC power supply is connected to both the first normally closed contact and the second common contact of the electro-mechanical switch, such that when each electro-mechanical switch is actuated by the central control unit, the respective common contacts are connected to respective normally opened contacts or to respective normally closed contacts, wherein the first normally opened contacts of all the electro-mechanical switches are connected to ground, and wherein the second normally opened contacts of all the electro-mechanical switches are connected to the positive output terminal.

6. The power unit of claim 1, wherein said means for controlling a magnitude and a shape of the required output voltage includes a solid-state switch connected between the first and the second normally closed contacts of at least one electro-mechanical switch.

7. The power unit of claim 1, further including an input unit setting operational order for the central control unit according to a pre-determined set of required output voltages.

8. The power unit of claim 1, further including an inspection device for inspection the output voltage on the output terminals and providing a feed-back to the central control unit.

9. The power unit of claim 1, wherein the independent DC power supply includes an independent battery unit.

10. The power unit of claim 1, wherein the independent DC power supply includes an individual independent DC power supply rectified from AC power supply.

11. A multi-voltage control which provides a graded multi-voltage output at first and second output terminals, comprising:
   a first independent DC power source having a negative terminal and a positive terminal and a unit voltage therebetween;
   a second independent DC power source having a negative terminal and a positive terminal;
   a first diode connecting from said positive terminal of said first independent DC power source to said output;
   a second diode connecting from said negative terminal of said first independent DC power source to said negative terminal of said second independent DC power source;

a contact switch which in a first switched state connects said positive terminal of said first independent DC power source to said negative terminal of said second independent DC power source and which in a second switched state electrically short-circuits said first diode and separately electrically short-circuits said second diode;

a solid switch member connected in series with said first and second output terminals, wherein opening said solid switch member disconnects said first and second independent DC power sources from forming a complete electrical circuit through said output terminals; and a means for controlling said solid switch member and said contact switch to open said solid switch member prior to switching said contact switch between said first switched state and said second switched state, and closing said solid switch member after said switching of said contact switch is complete.

12. The multi-voltage control of claim 11, further comprising a solid member for output-input level control.

13. The multi-voltage control of claim 12, wherein said solid member comprises a linear voltage control.

14. The multi-voltage control of claim 12, wherein said solid member comprises a pulse-width modulated (PWM) voltage control.

15. The multi-voltage control of claim 12, further comprising:

a means for adjustment of said output from said solid switch member so that a low voltage which is a whole number multiple of said unit voltage becomes a valley voltage and a high voltage greater than said unit voltage becomes a peak voltage of a wave form of said graded multi-voltage;

whereby a low ripple-wave voltage output is formed between said valley voltage and said peak voltage and is controlled by said solid member.

16. The multi-voltage control of claim 11, further comprising:

a bridge switch circuit for changing DC from said first and second independent DC power sources into a gradient voltage wave form.

17. The multi-voltage control of claim 16, wherein said gradient voltage wave form is an approximate sine wave.

18. The multi-voltage control of claim 11, wherein said first independent DC power source comprises a battery.

19. The multi-voltage control of claim 12, wherein said solid member comprises a chopped wave voltage control.

20. The multi-voltage control of claim 12, wherein said solid member is a two-phase device.

21. The multi-voltage control of claim 12, wherein said level control is a voltage control.

22. The multi-voltage control of claim 12, wherein said level control is a current control.

23. The multi-voltage control of claim 16, wherein said gradient voltage wave form is synchronous.

24. The multi-voltage control of claim 11, wherein said controlling means comprises a central processor unit.

25. The multi-voltage control of claim 11, wherein said contact switch comprises an electric-mechanical switch.

26. The multi-voltage control of claim 25, wherein said contact switch comprises a two-knife, two-throw switch.

27. The multi-voltage control of claim 11, wherein said unit voltage and said voltage between said negative and positive terminals of said second independent DC power source are equal.

28. The multi-voltage control of claim 16, wherein said controlling means further controls said solid switch member and said bridge switch circuit to open said solid switch member prior to switching said bridge switch circuit, and closing said solid switch member after said switching of said bridge switch circuit.

* * * * *